No. 634,987. Patented Oct. 17, 1899.
P. MAURICE.
CENTRIFUGAL WASHING APPARATUS FOR COALS, ORES, &c.
(Application filed Mar. 30, 1897.)
(No Model.) 5 Sheets—Sheet 1.

Witnesses

Inventor
Paul Maurice

No. 634,987. Patented Oct. 17, 1899.
P. MAURICE.
CENTRIFUGAL WASHING APPARATUS FOR COALS, ORES, &c.
(Application filed Mar. 30, 1897.)
(No Model.) 5 Sheets—Sheet 2.

No. 634,987. Patented Oct. 17, 1899.
P. MAURICE.
CENTRIFUGAL WASHING APPARATUS FOR COALS, ORES, &c.
(Application filed Mar. 30, 1897.)
(No Model.) 5 Sheets—Sheet 3.

No. 634,987. Patented Oct. 17, 1899.
P. MAURICE.
CENTRIFUGAL WASHING APPARATUS FOR COALS, ORES, &c.
(Application filed Mar. 30, 1897.)
(No Model.)
5 Sheets—Sheet 4.
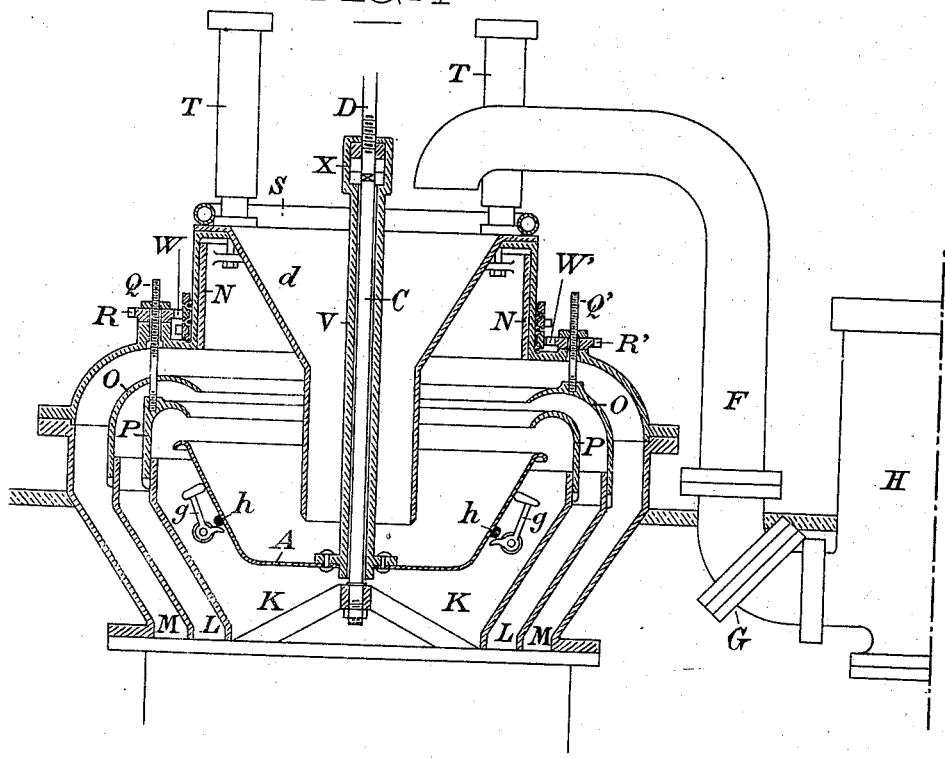
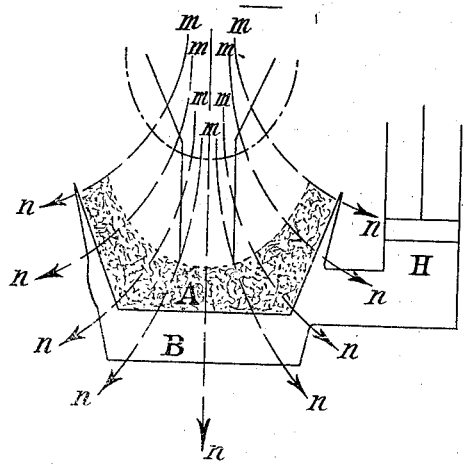
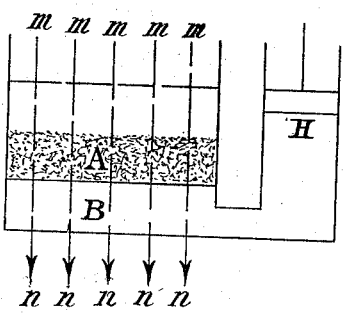
Witnesses
Xavier Janicot
Jean Germain
Inventor
Paul Maurice No. 634,987. Patented Oct. 17, 1899.
P. MAURICE.
CENTRIFUGAL WASHING APPARATUS FOR COALS, ORES, &c.
(Application filed Mar. 30, 1897.)
(No Model.) 5 Sheets—Sheet 5.
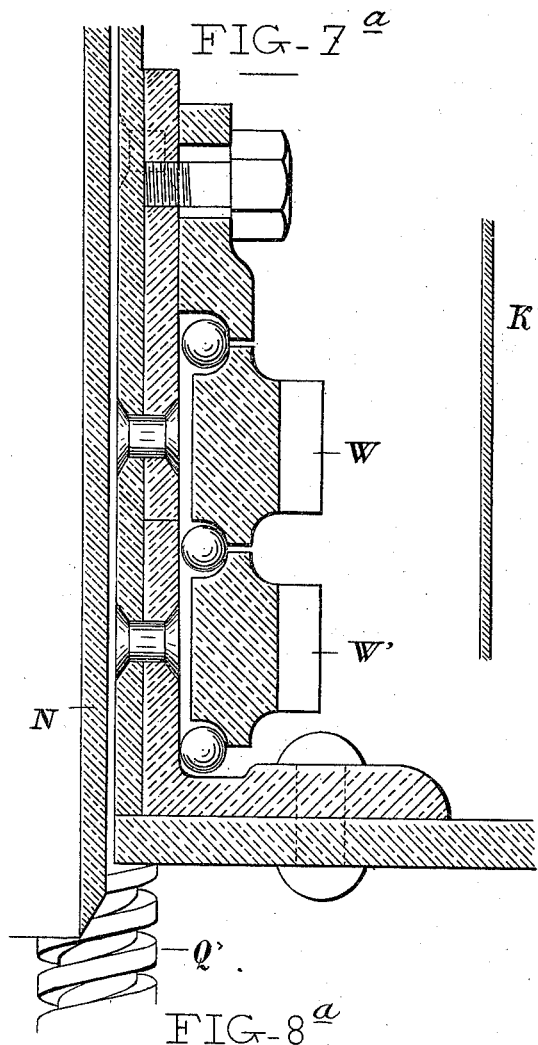
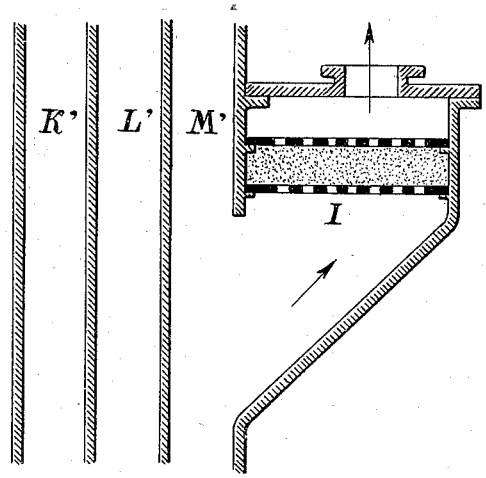
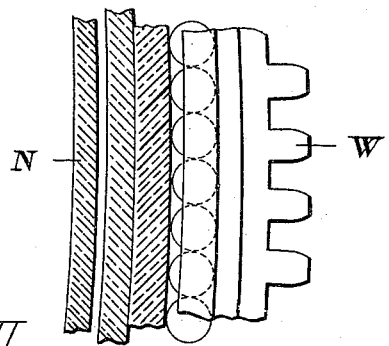
Witnesses
F. J. Elmore
A. M. E. Kennedy.
Inventor
Paul Maurice
By F. J. Hodge
atty

UNITED STATES PATENT OFFICE.

PAUL MAURICE, OF ST. ETIENNE, FRANCE, ASSIGNOR OF ONE-HALF TO LA SOCIÉTÉ NOUVELLE DES ÉTABLISSEMENTS DE L'HORME ET DE LA BUIRE, OF LYONS, FRANCE.

CENTRIFUGAL WASHING APPARATUS FOR COALS, ORES, &c.

SPECIFICATION forming part of Letters Patent No. 634,987, dated October 17, 1899.

Application filed March 30, 1897. Serial No. 629,928. (No model.)

*To all whom it may concern:*

Be it known that I, PAUL MAURICE, engineer, a citizen of the Republic of France, residing at St. Etienne, France, have invented certain new and useful Improvements in Centrifugal Washing Apparatus for Coals, Ores, and other Granular and Pulverulent Materials, (for which I have received Letters Patent in France, No. 259,330, dated September 2, 1896,) of which the following is a specification.

This invention relates to a centrifugal washing apparatus for coals, ores, and other granular or pulverulent material and will be described with reference to the accompanying drawings, in which—

Figure 1:
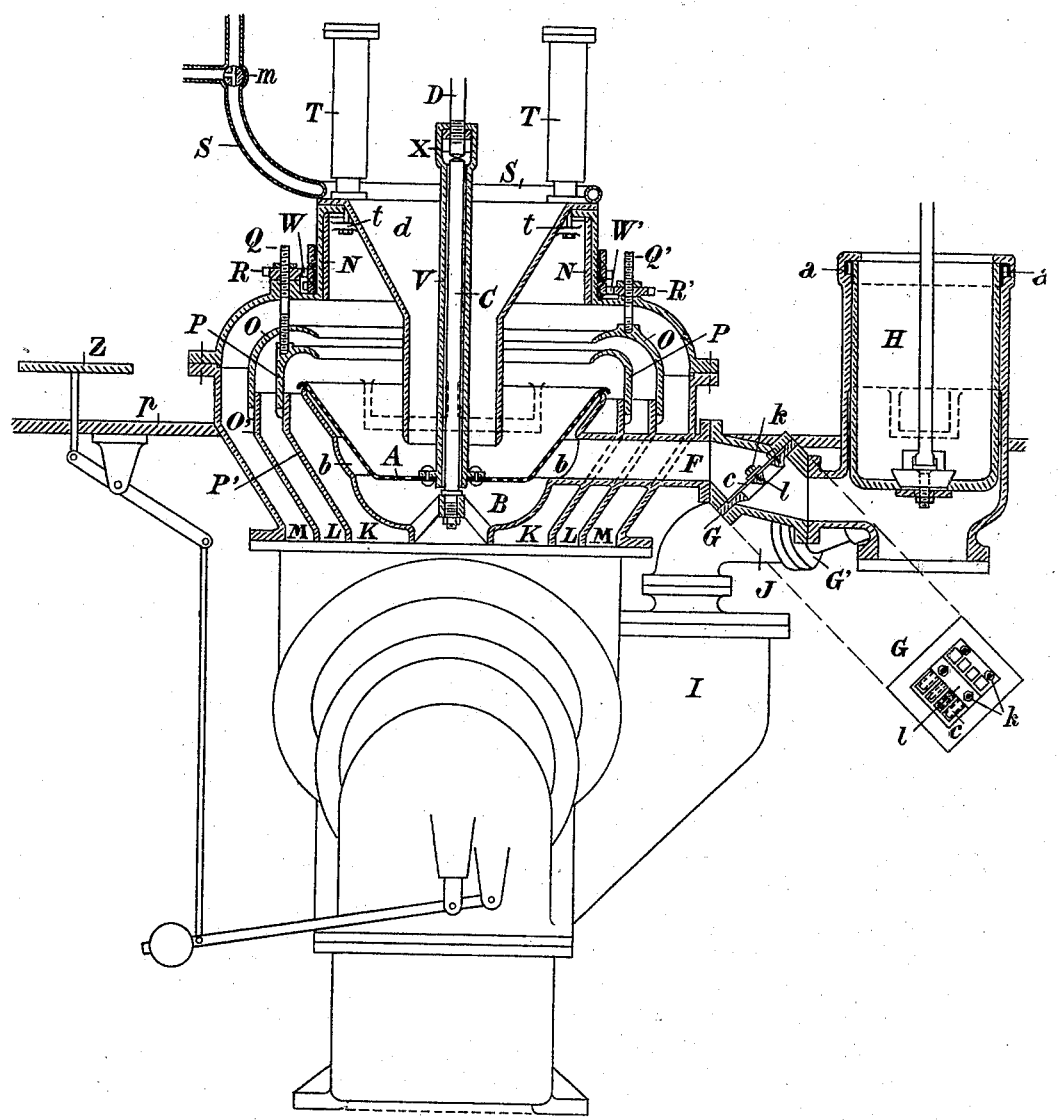
Figure 2:
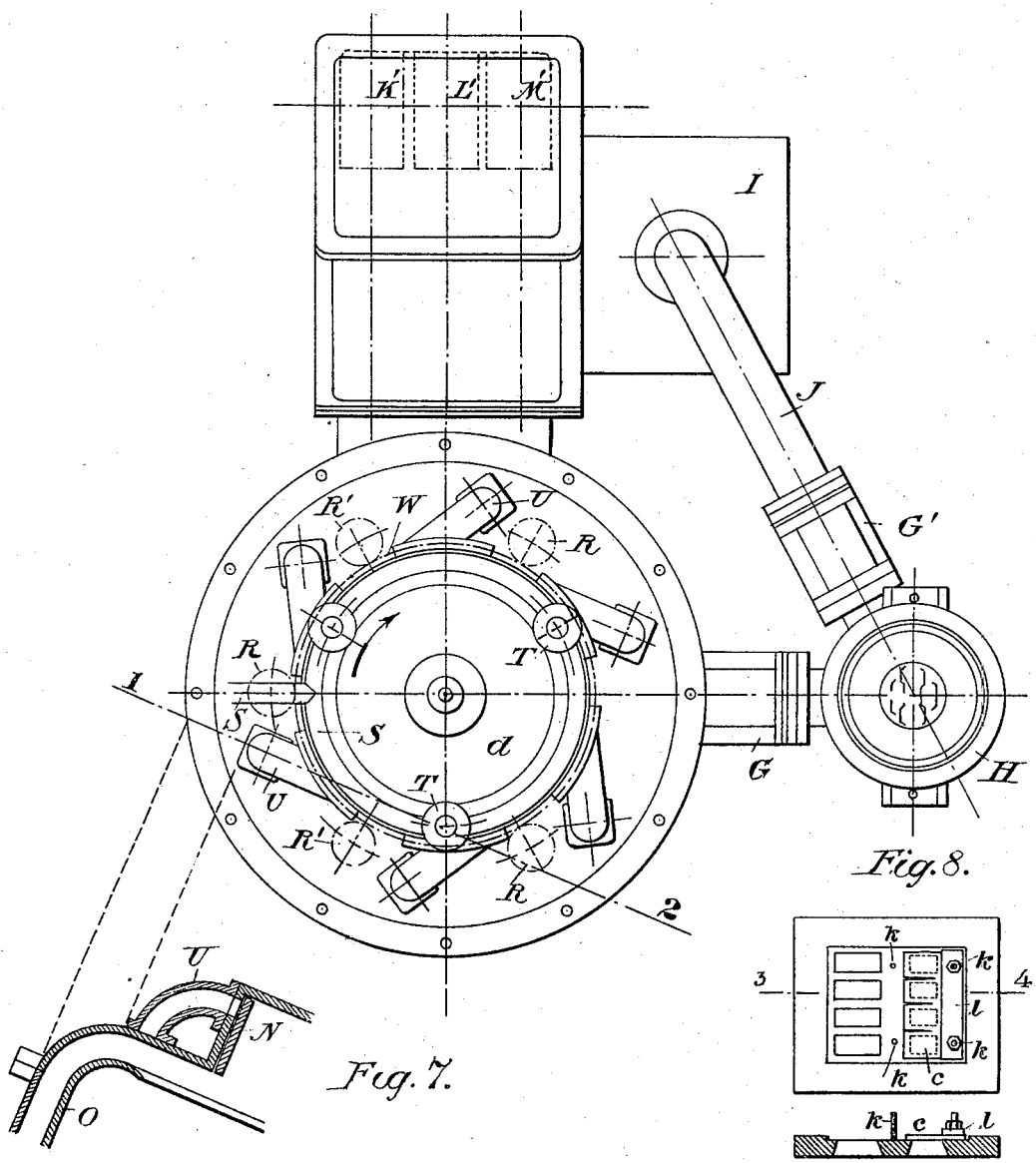

Figure 1 is an elevation with the upper part in section; Fig. 2, a plan view, and Fig. 3 a side elevation, partially in section, of the improved apparatus. Fig. 4 is a sectional elevation of a modified form of the apparatus, while Figs. 5 and 6 are diagrammatic views of the lines of force for the comparison of the improved apparatus with an ordinary washing vessel. Fig. 7 is a section through the axis of the tube U on the line 1 2 of Fig. 2. Fig. 8 is a plan view and a sectional elevation on the line 3 4 of the grated seat of the valves G G'. Figs. 7ª and 8ª are enlarged views showing in detail the racks for raising and lowering the sliding valves. Fig. 9 is an enlarged view of the decanting-box and adjacent compartments.

The improved apparatus is composed, essentially—

First, of a truncated conical (in the form of a frustum of a cone) washing vessel A, acting as a washing-table, on which the substances to be washed are spread in the same manner as on a horizontal washing-table of an ordinary washing apparatus. This vessel or washing-table is mounted on a hollow shaft V, which is connected to a vertical shaft D by a collar or socket X. The whole is revoluble on a pivot or fixed spindle C under the action of any suitable motor of which the speed is variable and adjustable at will. This washing vessel may be made either of perforated metal or of metallic gauze sustained by a truncated conical framework. The oscillating movements necessary for the separation of the particles subjected to treatment according to their specific gravity are then obtained by the combination of this washing vessel A with a fixed trough B, strengthened by ridges cast on it or in any other suitable manner. This trough B supports the pivot or spindle fixed in its center and is provided in its lower part with a discharge-plug Y, Fig. 3, manipulated from the exterior by a treadle Z or any other suitable arrangement allowing of the discharge of the mud or foreign matters of small dimensions which may have penetrated therein by passing through the grates of the valves G and G', hereinafter described. The water is raised in this trough by a pump having a plunger-piston H, which forces it to pass through the washing vessel and to bring up the charge which the centrifugal force and gravity tend constantly to force strenuously against the conical wall of this vessel. The plunger-piston of the pump passes through a leather ring $a$, Fig. 1. The water is drawn through a pipe J and valve G' and forced through the valve G and the pipe F, which opens into the trough B. It causes at the same time a circulation of water between an arbitrary point of the tight casing of the apparatus and the washing vessel with a return by that of the hoppers hereinafter described, where it is necessary to accelerate the carrying away of the products. (If it is a question, for example, of washing coal, this will be the external hopper. The pump will then draw the water from the compartment M', Fig. 2, of the coal-noria.) If necessary, there is interposed between the casing of the noria and the water-pipe J a decanting-box I in order to avoid the return into the washer of finer substances which otherwise would be drawn up by the pump. A filter-bed of coke or shavings occupies the central part of this box and water passes through the said filter-bed, filtering from the bottom to the top, while the pulverulent substances fall out beneath the filter. In front of the pipe F an annular and eccentric recess $b$, larger on the side where the water arrives by the pipe F than on the opposite side, is formed in the trough B to facilitate the equal distribution of the water and of the blow of the pump all over the periphery of the washing vessel.

The arrangement which has just been described is applicable for washing any substances containing a sufficient number of heavy grains sufficiently large not to pass downward through the holes in the washing vessel.

When the substances are very fine, the apparatus is modified in the manner shown in Fig. 4. In this case a washing vessel of the same form, but unperforated, must be employed, because the holes would be too small and would be quickly obstructed. The material employed must, in such case, be somewhat resilient, (like bronze or steel.) The blow of the pump is then replaced by means for producing vibrations of the washing vessel. The vibrations may be produced mechanically either by a periodical shock of hammers $g$, raised by cams $h$, situated on the external face of the washing vessel, or by any other suitable means. The trough B is dispensed with and the tube F discharges directly into the mouth of the hopper $d$, which then receives together the raw material, the forcing-water, and the water discharged by the pump. This water then drives the material down in such a proportion that the mass advances but slowly from the bottom toward the top of the washing vessel. In this case the lateral surface of the vessel must be more inclined, according as the substances to be treated are finer. The speed of rotation must at the same time be increased to increase the centrifugal force which determines the downfall of the substances treated on the vessel.

In the two arrangements hereinbefore described the dimensions of the pump H may be varied according to the nature and the quantity of the substances to be treated. They must be determined in such a way that the volume of water shall be just sufficient for raising and carrying away the heavier substances in spite of the combined action of centrifugal force and gravity, which tend to press them energetically against the washing vessel.

The inclination of the lateral surface of the washing vessel must in both of the aforesaid arrangements be such that at a normal speed of rotation the free surface of the liquid shall be nearly parallel to it in such a way that the median part of this lateral surface bisects nearly at a right angle the lines of force. (See Fig. 5.)

Secondly, of annular sliding valves O and P, which are arranged to effect the separation of the various classes of materials treated, which are collected at a suitable height above the washing vessel. For this object the last element of the internal slope of these valves must have the same inclination as the lateral surface of the washing vessel.

Thirdly, of a cylindrical shutter N, which is provided for closing the passages over, between, and under the sliding valves O and P by being raised or lowered, if such should become necessary, (more particularly when a sudden alteration in the composition of the raw material being treated takes place.) The water and the lighter materials then flow away by the pipes U, Figs. 2 and 3, in order to pass into the compartment M, while the heavier rest upon the vessel.

Fourthly, of an external tight casing, the cover of which carries several devices for operating the sliding valves O and P and the shutter N and supports the hopper $d$, in the center of which the motor-shaft revolves. This funnel or hopper serves for introducing into the apparatus the water and the substances to be treated.

Fifthly, of tight partitions arranged to divide the annular space comprised between the external casing and the upper edge of the washing vessel into as many distinct compartments as there are classes of material to be obtained—three, for instance. These partitions are fixed by cross-pieces or, better still, by ridges made on them at the time of casting. The upper part of each of these partitions assumes a cylindrical form and fits with a sufficient play against the interior of the corresponding annular sliding valve, which is terminated also by a cylindrical surface. Each annular sliding valve may be displaced vertically, it being guided on the external face of the corresponding partition. Thus the annular sliding valve O may be raised or lowered, sliding on the partition O', and the annular sliding valve P may be raised or lowered, sliding on the partition P'. The height of each separating sliding valve may thus be regulated independently of one another.

Sixthly, of hoppers or drains K L M of any suitable form for conveying the sorted materials to the apparatus—such as buckets, pumps, water-wheels, or the like—intended for extracting them from the washing apparatus. In the accompanying drawings hoppers of cylindro-conical form terminated by inclined drains are shown.

Figure 3:
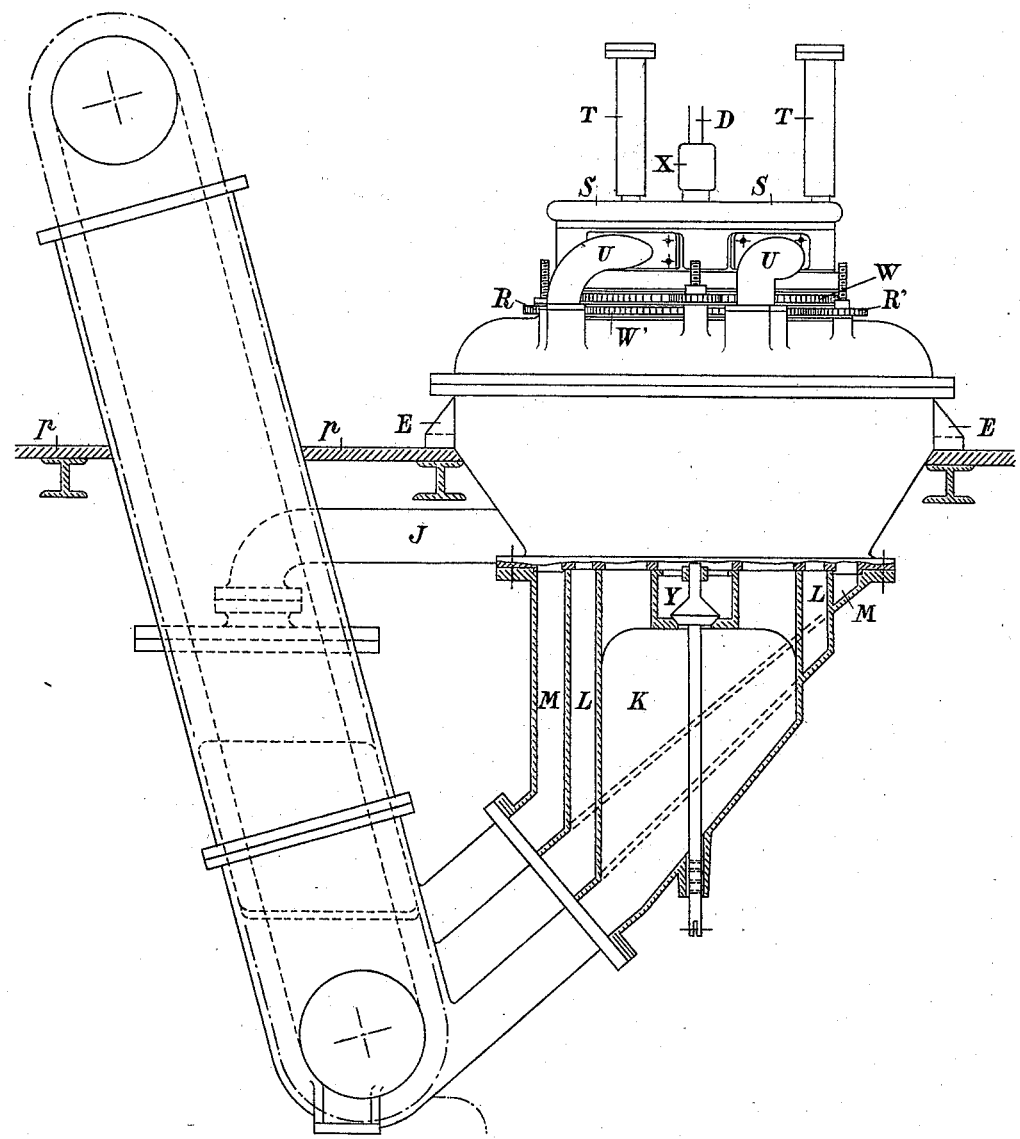

The whole apparatus held by the external casing is carried by two lugs E, Fig. 3, cast onto it and lying against I-irons.

Seventhly, of tight compartments K' L' M', arranged to form a continuation of the drains K L M and rising up to above the piezometric level of the water which is contained in the apparatus. It is in one of these three compartments, or even in each of them, according to requirements, that the suction-pipe of the pump opens. In the interior of these compartments also are arranged the norias, buckets, or other lifting apparatus which raise away the classified materials.

In the apparatus shown in the accompanying drawings, arranged for washing coal sized from naught up to three-eighths of an inch, the decanting-box I opens on the lateral face of the compartment M', where coal-buckets are placed, and water is drawn by the pump H from the decanting-box by the pipe J. The coal passes over the valve O into the compartment M and is raised by the chain-bucket (not shown in the drawings) and contained in the compartment M'. The slaty particles of coal pass between the two valves O and P into the compartment L and are raised by the chain buckets of the compartment L'. Finally, the "slates" pass under the valve P into the hopper K and thence to the chain of buckets of the compartment K'. The hopper K also receives the mud arising from the cleaning out of the trough B by means of the plug-valve.

Eighthly, of the devices for operating the shutter N and the sliding valves O P, comprising—

(a) Screws, such as Q, fixed on the valve P, the nuts of which screws are fixed in the center of pinions R, which engage with a circular rack W. This rack bears on the external face of the vertical part of the cover by means of ball-bearings, which facilitate its displacement. It is manipulated by a hand-wheel. (Not shown in the drawings.)

(b) Screws, such as Q', fixed on the valve O, manipulated, as hereinbefore mentioned, by other pinions R', and another circular rack W', also provided with ball-bearings.

(c) Hand-wheels for operating by pinions or endless screws, according to the degree of precision required, racks W W', which insure the independent movement of the valves O and P and the securing of them at a suitable height.

(d) Vertical rods t, fixed to the shutter N, passing through stuffing-boxes in the upper part of the cover in order to be manipulated from the outside either by means of any suitable mechanical arrangement or preferably by water, steam, air, or any other suitable fluid under pressure, the said fluid being distributed by a pipe S between cylinders T, where it acts on pistons fixed at the upper end of the operating-rods. The admission or escape of the fluid may be effected by turning a single three-way tap $m$, Fig. 1, placed at any suitable point within reach.

Ninthly, of grated valves G and G', which are characterized by a large delivery. They are composed of three parts—the admission ajutage or mouthpiece, the grated valve-seat, and the delivery ajutage or nozzle. The valve-seat, which may, according to requirements, be horizontal or inclined, is formed of a grating of cast-iron, bronze, or other suitable metal, perforated with rectangular openings the greatest dimension of which is according to the line of greatest slope, if the seat is inclined. The closing of each row of openings is insured by a strip $c$ of leather, india-rubber, or other suitable flexible and impervious material, tightened and maintained at its upper part by a metallic strip fixed by two screw-bolts $k$. Each sheet is divided into as many tongues as there are rectangular openings in the row which it covers.

Tenthly, of a platform $p$, arranged at any height which may be found most suitable for the looking out, driving, and manipulating of the apparatus.

Finally, of the pump H, described incidentally in the paragraph relating to the washing vessel, that rests on the framework of the platform or on foundations by means of two lugs cast thereon.

The working of the apparatus is as follows: The centrifugal washing apparatuses hitherto employed for the treatment of coal or ore only employed centrifugal force as an agent to convey the material to be treated parallel to a surface on which they rested. My apparatus must be kept full of water up to the level of the discharge-pipes U. The principle on which the apparatus hereinbefore described is based is quite different. The rotation of the washing vessel and of the mass of water which it carries with it creates a field of force in which the centrifugal force and gravity are combined and in which consequently the lines of force $m$ $n$ are no longer vertical straight lines, Fig. 6, but divergent curves, Fig. 5. The conical wall of the washing vessel is just about normal to the curved lines of force and behaves in the washing apparatus hereinbefore described, as shown in Fig. 5, exactly like an ordinary horizontal washing-table in an ordinary piston washing apparatus, in which the lines of force are vertical, Fig. 6. The advantages resulting from this are, first, a much greater velocity of separation, because this velocity of separation is for a given size proportionate to the square root of the acceleration imparted to the unit of mass, an acceleration considerably increased by centrifugal force, and, second, the possibility of increasing with the speed of the engine the speed of discharge of the mass or of diminishing it by diminishing the speed of the engine. An approximately constant thickness may thus always be insured to the beds of various classes of material to be obtained whatever may be the proportion of sterile material contained in the raw material subjected to washing.

The following is the mode of operation: In order to start the apparatus, it is first filled completely with water, and on its being started the coal or ore, as well as the water intended to replace that which is carried away by the wash products, are inserted in the hopper $d$, which must be maintained constantly full. When granular products are treated upon a perforated vessel, the speed of rotation must be such that under the action of the pump (thirty to two hundred strokes per minute, according to the size of the grains) the mass only moves slowly from the center to the circumference in such a way as to undergo a great number of strokes of the piston. When pulverulent products are treated upon a solid vessel, the vibrations of the vessel must be thirty to fifty per second, and the speed of rotation must be such that transport from the center to the circumference is very slow. At each stroke of the piston or at each vibration of the vessel the grains are projected normally to the lateral surface and fall back on this surface, becoming sorted little by little by the downfall in the body of water under the influence of the acceleration which is imparted to them as the result of gravity and centrifugal force combined together. In a word, all goes on in this washing apparatus the same as if it were a question of an ordinary washing plant where gravity came to be considerably increased. The washing-bed will have on the external edge of the vessel a thickness so much greater as the space between the bottom of the hopper (which is always full) and the bottom of the vessel itself is greater. The materials perfectly sorted in layers, according to density, present themselves before the sliding valves, which effect the separation into three or more distinct layers.

I declare that what I claim is—

1. In a centrifugal jigger, the combination of a fixed trough in which a pump forces a liquid, said trough being provided with an annular and eccentric recess in order to facilitate equal distribution of the liquid on all its periphery, and a perforated washing vessel having the form of a truncated conical vessel or basin, the concavity of which is turned upward, said vessel being capable of revolving on a vertical shaft with a speed of rotation which is variable and adjustable at will, the upper edge of the trough being circular and in proximity to the upper part of the lateral surface of the truncated conical washing vessel, substantially as described.

2. In a centrifugal jigger, the combination of a fixed trough in which a pump forces water, a rotary perforated washing vessel surmounting said trough the concavity of which vessel is turned upward and an external fixed water-tight casing surrounding the trough and the washing vessel and leaving between its internal wall and the periphery of the washing vessel and also around the trough which is beneath an annular and concentric space for the passage of the washed products which are thrown off the washing vessel under the action of centrifugal force, substantially as described.

3. In a centrifugal jigger, the combination of a fixed trough in which a pump forces water, said trough being surmounted by a rotary perforated washing vessel, the concavity of which is turned upward and an external fixed and water-tight casing, leaving around the washing vessel and the trough an annular space for the passage of the washed products, with fixed partitions terminating at the level of the upper part of the lateral surface of the truncated conical washing vessel forming cylindrical zones which divide this annular space into as many annular and concentric compartments as there are grades to be separated of the materials to be treated, substantially as hereinbefore set forth.

4. In a centrifugal jigger, the combination of a rotary perforated washing vessel, the concavity of which is turned upward, a fixed and water-tight casing and fixed partitions forming around the washing vessel concentric and annular compartments for the passage of the various grades of the washed products, with circular valves capable of being displaced vertically and independently one of the other in such a way as to close the inlet or regulate the opening of each of these annular compartments, the internal edge of each of these circular valves being placed above the external edge of the washing vessel, while the external edge of the latter rests and is guided on the external and cylindrical wall of the corresponding fixed partition.

5. In a centrifugal jigger, the combination of a rotary washing vessel, the concavity of which is turned upward, a fixed and water-tight casing and fixed partitions forming around the washing vessel annular and concentric compartments for the passage of the various grades of the washed products and circular valves capable of being displaced vertically and independently one of another so as to close and open more or less the inlet to these compartments with a fixed cover on the external casing having in its center a funnel through which passes and in which revolves the shaft on which this washing vessel rotates, the said cover and funnel allowing the circular valves and the compartments which give passage to the various grades of the washed products to be maintained completely immersed however great the speed of rotation of the washing vessel may be and for introducing according to requirements water or the substances to be treated to the center of the washing vessel, around its axis of rotation in a very equally distributed manner, substantially as described.

6. In a centrifugal jigger, the combination of a rotary washing vessel, the concavity of which is turned upward, a fixed and water-tight casing and fixed partitions forming around the washing vessel annular and concentric compartments for the passage of the various grades of the washed products, circular valves capable of being displaced vertically and independently one of the other in such a way that the internal edges of these valves placed at the external edge of the washing vessel may close and open more or less at the entrance of the compartments, with a cylindrical valve which by descending vertically may successively cover the internal edges of the various circular valves commencing at the top in such a way as to allow the openings of the compartments to be closed simultaneously and rapidly between the various valves and between the lowest and the washing vessel without it being necessary to disarrange the regulation of the openings of the compartments, such regulation being effected by means of the circular valves, substantially as described.

7. In a centrifugal jigger, the combination of a rotary washing vessel, the concavity of which is turned upward, a fixed and water-tight casing and fixed compartments forming around the washing vessel annular and concentric compartments for the passage of the various grades of washed products, circular valves capable of being displaced vertically and independently one of the other in such a way that the internal edges of these superposed valves at the external edge of the washing vessel may close and open more or less the entrance to the compartments, a cylindrical valve which may in moving vertically cover or uncover simultaneously and rapidly the openings to the compartments regulated by the circular valves, a fixed trough placed under the rotary and truncated washing vessel, in which trough a suction-pump forces water drawn by its suction into the annular compartments which receive the washed products, decanting-boxes in which the water on its exit from the said compartments passes from bottom to top through a filtering-bed before penetrating into the suction-pipe, a discharge valve or tap operated from the outside enabling the mud which might accumulate in the trough beneath the washing vessel to be expelled, a cover fixed on the tight casing of the apparatus provided in its center with a funnel in which the rotary shaft of the washing vessel rotates and having around this funnel a cylindrical socket in which the cylindrical valve may travel vertically in such a way that when this cylindrical valve is lowered all the annular compartments are closed including the external compartment, and pipes connecting the upper part of the socket of the cylindrical valve with the compartments in which the suction of water by the pump is made in order that the circulation of the water shall not be interrupted by the operation of the cylindrical valve.

8. In a centrifugal jigger comprising a rotary washing vessel, annular and concentric compartments around this washing vessel and circular valves intended to move vertically for opening and closing more or less these compartments, the combination of one of these circular valves or of each of them with vertical screws fixed to the said valve on different points of the same circle, the nut of each screw being in the center of a pinion which may revolve but cannot move vertically, the said pinions which are all of the same diameter and of the same number of teeth engaging with a circular rack operated by a hand fly-wheel by means of a pinion or endless screw the said rack resting by two projections on two sets of ball-bearings the said balls traveling either in a fixed race or on an adjacent rack similar to the first, substantially as described.

9. In a centrifugal jigger, comprising a rotary washing vessel annular and concentric compartments around said washing vessel, circular valves intended to move vertically for opening and closing more or less the said compartments and a cylindrical valve which in descending covers and obstructs the openings left free by the circular valves, the combination of this cylindrical valve with vertical spindles fixed on the said valve, stuffing-boxes allowing these spindles to penetrate into the cylinders where pistons fixed at the upper part of each spindle move, vertical cylinders in which these pistons travel in rising when any fluid under pressure acts on the lower faces of the piston the descending movement of these pistons being produced by the weight of the cylindrical valve itself when the fluid under pressure contained in the cylinders is allowed to escape, a single distributing-tube bringing the fluid under pressure to the base of each cylinder or allowing it to escape according to the position given to the tap hereinbefore mentioned and finally a three-way cock allowing the distributing-tube to be closed when it is desired to arrest the cylindrical valve in any position or of the distributing-tube being placed in communication with the reservoir for the fluid under pressure when it is desired to raise the cylindrical valve or for placing the distributing-tube in communication with the atmosphere in order to allow of the fluid under pressure contained in the cylinders to escape when it is desired to lower the cylindrical valve, substantially as described.

In testimony whereof I have signed my name to this specification in the presence of two subscribing witnesses.

PAUL MAURICE.

Witnesses:
 XAVIER JAINCOT,
 JEAN GERMAIN.